US012373650B2

(12) United States Patent
Thomas et al.

(10) Patent No.: US 12,373,650 B2
(45) Date of Patent: Jul. 29, 2025

(54) EXPLAINABLE PASSAGE CLASSIFICATION

(71) Applicant: International Business Machines Corporation, Armonk, NY (US)

(72) Inventors: John Jai Thomas, Fishkill, NY (US); Stephen Arthur Boxwell, Worthington, OH (US); Kristen Maria Summers, Takoma Park, MD (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 616 days.

(21) Appl. No.: 17/586,201

(22) Filed: Jan. 27, 2022

(65) Prior Publication Data

US 2023/0237274 A1 Jul. 27, 2023

(51) Int. Cl.
*G06F 40/35* (2020.01)
*G06F 16/353* (2025.01)
(Continued)

(52) U.S. Cl.
CPC .............. *G06F 40/35* (2020.01); *G06F 18/22* (2023.01); *G06F 18/2431* (2023.01); *G06F 40/284* (2020.01)

(58) Field of Classification Search
CPC ...... G06F 40/35; G06F 40/284; G06F 40/279; G06F 40/20; G06F 40/30; G06F 40/00;
(Continued)

(56) References Cited

U.S. PATENT DOCUMENTS 7,752,159 B2 7/2010 Nelken et al.
7,937,263 B2 5/2011 Carrier et al.
(Continued)

FOREIGN PATENT DOCUMENTS

WO 2021051503 A1 3/2021

OTHER PUBLICATIONS

Carrera-Trejo et al., Latent Dirichlet Allocation complement in the vector space model for Multi-Label Text Classification, International Journal of Combinatorial Optimization Problems and Informatics, vol. 6, No. 1, pp. 7-19, 2015.
(Continued)

*Primary Examiner* — Leshui Zhang
(74) *Attorney, Agent, or Firm* — Garg Law Firm, PLLC; Rakesh Garg; Kristofer Haggerty

(57) ABSTRACT

An embodiment includes tokenizing an input passage into an n-gram sequence of tokens. The embodiment also includes evaluating the input passage using a trained classification model that generates an output indicative of a classification of the input passage. The embodiment also includes generating a first token vector for a first token of the sequence of tokens and projecting the first token vector to a higher dimensional space, resulting in a first projected token vector. The embodiment also includes generating a first similarity score for the first projected token vector based on comparisons of the first projected token vector to each of a plurality of class representations. The embodiment also includes generating a ranked list of the tokens, wherein the generating of the ranked list includes ranking the first token among others of the tokens based on the first similarity score.

20 Claims, 8 Drawing Sheets

(51) Int. Cl.
*G06F 18/22* (2023.01)
*G06F 18/2431* (2023.01)
*G06F 40/284* (2020.01)

(58) Field of Classification Search
CPC ...... G06F 40/216; G06F 40/211; G06F 18/22; G06F 18/2431; G06F 18/24; G06F 18/243; G06F 16/35; G06F 16/3329; G06F 16/332; G06F 16/33; G06F 16/30; G06F 16/353; G06F 16/90332; G06F 16/24578; G06F 16/2457; G06F 16/313; G06F 16/9535; G06F 16/285; G06F 16/345; G06F 17/27; G06F 17/2785; G06N 20/00; G06N 3/08; G06N 3/045; G06N 3/084
USPC ...... 704/1–9, 15.014; 706/12, 13, 15, 16, 17, 706/19, 20, 21, 25, 30, 31, 45, 46, 48
See application file for complete search history.

(56) References Cited

U.S. PATENT DOCUMENTS

| | | |
|---|---|---|
| 8,838,437 B1 | 9/2014 | Buryak et al. |
| 9,928,234 B2 | 3/2018 | Kolotienko et al. |
| 10,565,244 B2 | 2/2020 | Kershaw et al. |
| 10,733,383 B1* | 8/2020 | Shah ................. G06F 40/216 |
| 10,943,071 B2 | 3/2021 | Walker et al. |
| 2006/0253439 A1* | 11/2006 | Ren ..................... G06F 16/313 |
| | | 707/999.005 |
| 2007/0106493 A1* | 5/2007 | Sanfilippo ............ G06F 40/30 |
| | | 704/9 |
| 2013/0262467 A1 | 10/2013 | Zhang et al. |
| 2018/0357531 A1 | 12/2018 | Giridhari et al. |
| 2019/0278846 A1* | 9/2019 | Xiang ..................... G06F 16/00 |
| 2019/0362710 A1* | 11/2019 | Yannam ................ G06F 40/216 |
| 2020/0097496 A1* | 3/2020 | Alexander ........... G06F 16/355 |

OTHER PUBLICATIONS

Ross et al., Right for the Right Reasons: Training Differentiable Models by Constraining their Explanations, Proceedings of the Twenty-Sixth International Joint Conference on Artificial Intelligence (IJCAI-17), Aug. 19-25, 2017.

Wallace et al., Interpreting Neural Networks With Nearest Neighbors, Nov. 7, 2018.

Aubakirova et al., Interpreting Neural Networks to Improve Politeness Comprehension, Proceedings of the 2016 Conference on Empirical Methods in Natural Language Processing, pp. 2035-2041, Nov. 1-5, 2016.

Mullenbach et al., Explainable Prediction of Medical Codes from Clinical Text, Proceedings of NAACL-HLT 2018, pp. 1101-1111, Jun. 1-6, 2018.

Xie et al., An Interpretable Knowledge Transfer Model for Knowledge Base Completion, Proceedings of the 55th Annual Meeting of the Association for Computational Linguistics, pp. 950-962, Jul. 30-Aug. 4, 2017.

* cited by examiner

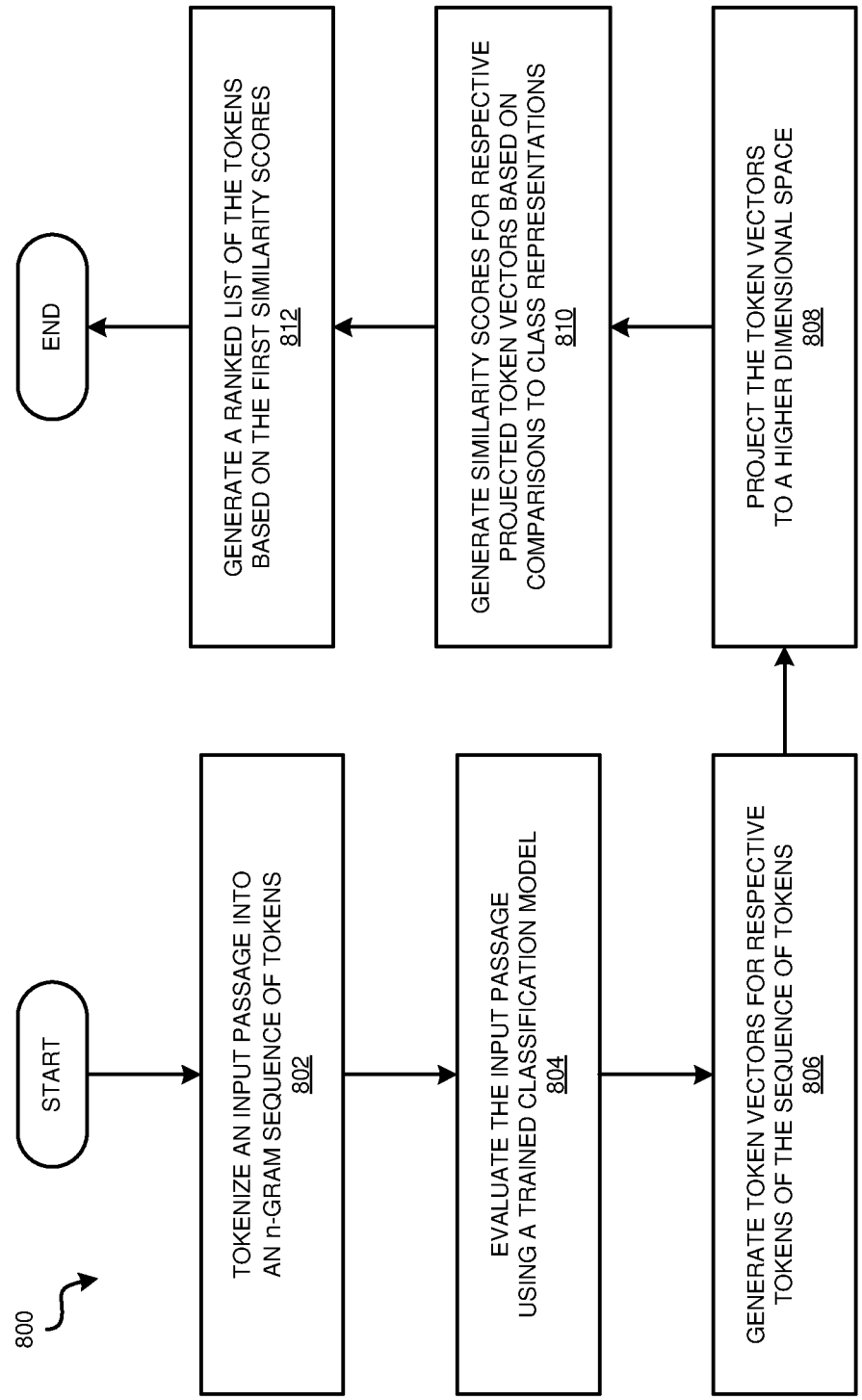

EXPLAINABLE PASSAGE CLASSIFICATION

BACKGROUND

The present invention relates generally to a method, system, and computer program product for data processing. More particularly, the present invention relates to a method, system, and computer program product for explainable passage classification.

Artificial intelligence (AI) technology has evolved significantly over the past few years. Modern AI systems include machine learning systems that are achieving human level performance on cognitive tasks like converting speech to text, recognizing objects and images, or translating between different languages. This evolution holds promise for new and improved applications in many industries.

An Artificial Neural Network (ANN)—also referred to simply as a neural network—is an example of a machine learning system that is often used for performing data classification tasks. ANNs are processing devices (algorithms and/or hardware) that are made up of a number of highly interconnected processing elements (nodes) that process information by their dynamic state response to external inputs. ANNs are loosely modeled after the neuronal structure of the mammalian cerebral cortex, but on much smaller scales. A large ANN might have hundreds or thousands of processor units, whereas a mammalian brain has billions of neurons with a corresponding increase in magnitude of their overall interaction and emergent behavior.

A machine learning system that performs data classification is sometimes referred to as a classifier. A classifier is a type of ANN that includes an algorithm that learns a function that separates two or more classes of data. There are many different types of classifiers. Examples include image classifiers that classify images based on what is being depicted (e.g., classifying images as depicting a cat or a dog) and sentiment classifiers that classify text based on what is being expressed (e.g., classifying text as expressing a positive or negative opinion).

A feedforward neural network is an ANN in which connections between the units do not form a cycle. A convolutional neural network (CNN) is an example of a feed-forward ANN that is sometimes used as a classifier. In a CNN, the connectivity pattern between the nodes (neurons) is inspired by the organization of the animal visual cortex, whose individual neurons are arranged to respond to overlapping regions tiling a visual field. As a result, CNNs are particularly efficient in recognizing image features, such as by differentiating pixels or pixel regions in a digital image from other pixels or pixel regions in the digital image. Generally, a CNN is designed to recognize images or parts of an image, such as detecting the edges of an object recognized on the image, for tasks such as image classification.

A recurrent neural network (RNN) is another example of a type of ANN that is sometimes used as a classifier. An RNN includes recurrent connections (i.e., feedback connections) that form cycles in the network's topology. In an RNN, a neuron feeds back information to itself in addition to passing it to the next neuron in the RNN. Computations derived from earlier inputs are fed back in the network, which gives an RNN a form of short-term memory. Feedback networks, such as RNNs, are dynamic in that the state of an RNN is continuously changing until it reaches an equilibrium point. For this reason, RNNs are particularly well-suited for detecting relationships across time in a given set of data. Long-Short Term Memory (LSTM) and Gated Recurrent Units (GRU) are types of RNNs that include a state-preserving mechanism through built-in memory cells. These types of RNNs are particularly well-suited for multivariate time series data analysis and forecasting, handwriting recognition, natural language processing, and task synthesis.

A deep neural network (DNN) is another example of an ANN that is sometimes used as a classifier. A DNN has multiple hidden layers of units between the input and output layers. Similar to shallow ANNs, DNNs can model complex non-linear relationships. DNN architectures generate compositional models where the object is expressed as a layered composition of image primitives. The extra layers enable composition of features from lower layers, allowing for the potential of modeling complex data with fewer units than a similarly performing shallow ANN.

In addition to neural networks, there are numerous other machine learning algorithms that are widely used in various applications. Some common examples include linear regression, logistic regression, and support vector machines (SVMs). Linear regression tries to fit a function to a set of input data points and is often used to project values, such as a future asset value or future price of a product. Logistic regression also tries to fit a function to a set of data points, but is typically used to classify data by predicting the likelihood of a data point belonging to a certain class. SVMs are used for both regression and classification, for example by fitting a hyperplane to datapoints and then classifying additional data points based on where they exist relative to the hyperplane. These are but a few examples of the many different machine learning algorithms in use today.

SUMMARY

The illustrative embodiments provide for explainable passage classification. An embodiment includes tokenizing an input passage into an n-gram sequence of tokens. The embodiment also includes evaluating the input passage using a trained classification model that generates an output indicative of a classification of the input passage in one of a plurality of predefined classes. The embodiment also includes generating a first token vector for a first token of the sequence of tokens. The embodiment also includes projecting the first token vector to a higher dimensional space, resulting in a first projected token vector. The embodiment also includes generating a first similarity score for the first projected token vector based on comparisons of the first projected token vector to each of a plurality of class representations. The embodiment also includes generating a ranked list of the tokens, where the generating of the ranked list includes ranking the first token among others of the tokens based on the first similarity score. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 8 depicts a flowchart of an example process for generating passage classification explanations in accordance with an illustrative embodiment.

DETAILED DESCRIPTION

Figure 1:
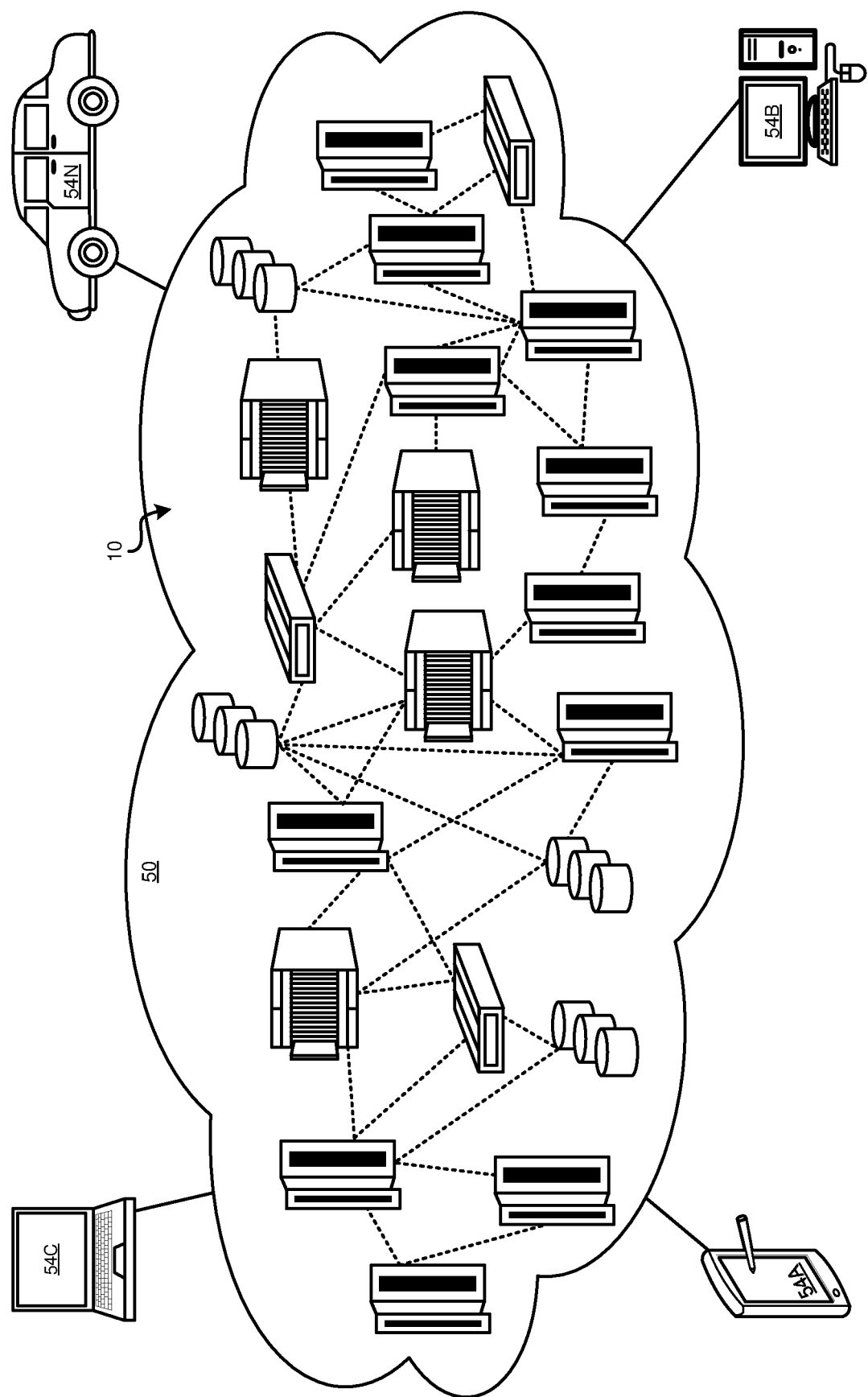
FIG. 1 depicts a cloud computing environment according to an embodiment of the present invention.

Various artificial intelligence ("AI") technologies utilize "cognitive models" enabled by big data platforms. Such models termed as "cognitive entities" are aimed to remember the past, interact with humans, continuously learn, and refine their responses for the future. The cognitive capabilities enrich the automation of complex tasks and provide dynamic responses that improve user satisfaction compared to devices of the past that relied on static memory.

Neural networks have demonstrated great promise as a technique for automatically analyzing real-world information with human-like accuracy. In general, neural network models receive input information and make predictions based on the input information. For example, a neural network classifier may predict a class of the input information among a predetermined set of classes. Whereas other approaches to analyzing real-world information may involve hard-coded processes, statistical analysis, and/or the like, neural networks learn to make predictions gradually, by a process of trial and error, using a machine learning process. A given neural network model may be trained using a large number of training examples, proceeding iteratively until the neural network model begins to consistently make similar inferences from the training examples that a human might make.

Natural language processing (NLP) is one class of problems to which neural networks may be applied. NLP can be used to instill new neural networks with an understanding of individual words and phrases. Nevertheless, NLP tasks tend to be very complex, making it challenging to achieve complete accuracy. For example, for most problems or tasks in NLP, understanding context is also important. Translation models need to understand, for example, how the words in an English sentence work together in order to generate a German translation. Likewise, summarization models need context in order to know which words are most important. Models performing sentiment analysis need to understand how to pick up on key words that change the sentiment expressed by others. Question answering models need to gain an understanding of how words in a question shift the importance of words in a document.

As a result, neural-network based NLP systems generate classification errors from time to time. When classification error occurs, it is desirable to be able to diagnose the reason for the classification error. However, determining the reason for a classification error by a neural network is challenging due to the difficulty involved in understanding how exactly neural networks arrive at their predictions. This is sometimes referred to as the "black box" problem of neural networks: while they consistently demonstrate amazing accuracy, there remains a degree of mistrust because the predictions are based on a process that is not readily understood.

The illustrative embodiments recognize that there is a need to improve the transparency of NLP classification systems by providing humanly-interpretable explanations of classification predictions. The illustrative embodiments recognize that the presently available tools or solutions do not address these needs or provide adequate solutions for these needs. The illustrative embodiments used to describe the invention generally address and solve the above-described problems and other problems related to improving the transparency of NLP classification systems by providing humanly-interpretable explanations of predictions made by NLP classification systems.

In an illustrative embodiment, a classification process according to disclosed embodiments receives a novel input passage to be classified and tokenizes the input passage into an n-gram sequence of tokens, for example where each token is a unigram or bigram. In some embodiments, each n-gram is a sequence of adjacent elements from a string, where each element may be a word, a letter, or a symbol.

In an illustrative embodiment, the process evaluates the novel input passage using an ML model. In some such embodiments, the ML model includes a trained classification model that generates an output indicative of a classification of the input passage in one of a plurality of predefined classes. In some such embodiments, the ML model is a trained deep semantic classification model. In some embodiments, the output of the ML model includes a vector of probability values corresponding to respective classes of the plurality of predefined classes.

In an illustrative embodiment, the process generates token vectors for respective tokens of the sequence of tokens. In some such embodiments, the process projects each of the token vectors to a higher dimensional space, resulting in projected token vectors. In some embodiments, the trained classification model is an n-dimensional model, and the process projects each of the token vectors to a 2*n-dimensional space. For example, in some embodiments, the classification module is a 50-dimensional model, and the process projects each of the token vectors to a 100-dimensional space.

In an illustrative embodiment, the process generates similarity scores for each of a plurality of class representations to the novel input passage. In some embodiments, the class representations include reference passages representative of respective classes of variation distinguished by the ML model. In various embodiments, the reference passages may be predefined or may be input by a user. Alternative embodiments may utilize other types of class representations. For example, in some embodiments, the ML model may be trained to perform sentiment analysis by classifying a passage according to polarity (e.g., positive, negative, or neutral) or according to urgency (e.g., highly urgent, moderately urgent, not urgent, etc.). In some such embodiments, the class representations may include features such as word counts (e.g., total numbers of positive and negative words) or n-gram counts (e.g., total numbers of positive and negative bigrams, trigrams, etc.).

In some embodiments, the process calculates the similarity of each class representation to a vector representation of the novel input passage using any known method of measuring the similarity of two n-grams of text, such as cosine similarity. In some embodiments, the process includes using a Gaussian Naïve Bayes (GNB) classifier for determining the degree of similarity of the novel input passage to each of the class representations. The process then outputs a ranked list of the class representations as an ordered list of most to least (or vice-versa) similar to the novel input passage.

In an illustrative embodiment, the process ranks n-grams in the novel input passage based on their fit in a previously established reference class. In some embodiments, this is done by summing the fit of each n-gram based on the fit with each class, with the fit of unselected classes counting negatively.

In some embodiments, the process calculates the similarity of each of the projected token vectors representative of respective n-grams of the input passage to each of the class representations. For example, in such embodiments, the process generates a first similarity score for the first projected token vector based on comparisons of the first projected token vector to each of the plurality of class representations, generates a second similarity score for a second projected token vector based on comparisons of the second projected token vector to each of the plurality of class representations, and so on for each of the projected token vectors.

In some embodiments, the process iterates through each of the projected token vectors individually. For example, for the first iteration, the process calculates a plurality of similarity distance values for the first projected token vector-one for each of the plurality of reference passages-based on distance values determined for each of the plurality of reference passages from the first projected token vector. In some such embodiments, the process then compares each of the plurality of similarity distance values for the first projected token vector to a predetermined threshold value, and associates the first projected token vector with each class for which the similarity distance value is within a threshold distance (i.e., less than the predetermined threshold value). The process then repeats this process for each of the remaining projected token vectors. The result of this processing will be a list of the n-grams corresponding to the plurality of projected token vectors and their respective associated one or more (or none) classes or distance values.

In some embodiments, the process will select one of the classes as a designated class, and its associated class representation as a designated class representation. In some alternative embodiments, the user selects one of the classes as a designated class, and its associated class representation as a designated class representation. In some embodiments, the user may opt to select the designated class and designated class representation, for example to investigate the reason for a particular ML model class prediction, or may opt to allow the process to select the designated class and designated class representation.

The process will then calculate similarity scores for each of the n-grams of the novel input passage to the designated class or designated class representation. In some such embodiments, the process calculates the similarity scores by adding one or more points if the n-gram is associated with the designated class, and by subtracting one or more points if the n-gram is associated with one or more classes other than the designated class. In some such embodiments, the process calculates the similarity scores by adding one or more points if the n-gram is associated with the designated class, with the number of points that are added depending on the distance from the designated class representation, where the number of points is inversely proportional to the distance. In some such embodiments, the process calculates the similarity scores by subtracting one or more points if the n-gram is associated with one or more classes other than the designated class, with the number of points that are subtracted depending on the distance(s) from the other class representations, where the number of points subtracted is inversely proportional to the respective distance.

The process then generates a ranked list of the tokens (n-grams of the novel input passage). In some embodiments, the process generates the ranked list according to the similarity scores, from most similar to least similar (or vice-versa). The process then outputs this list as a classification explanation that provides a user with an indication of which word or phrase from the input passage were most and least influential to the ML model when classifying the passage. In some embodiments, the process outputs the list to a user interface, which then renders a display of the ranked list of the words or phrases.

An embodiment can be implemented as a software application. The application implementing an embodiment can be configured as a modification of an existing image analysis system, as a separate application that operates in conjunction with an existing image analysis system, a standalone application, or some combination thereof.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example.

Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, training data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefore, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (Saas): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

With reference to FIG. 1, this figure illustrates cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
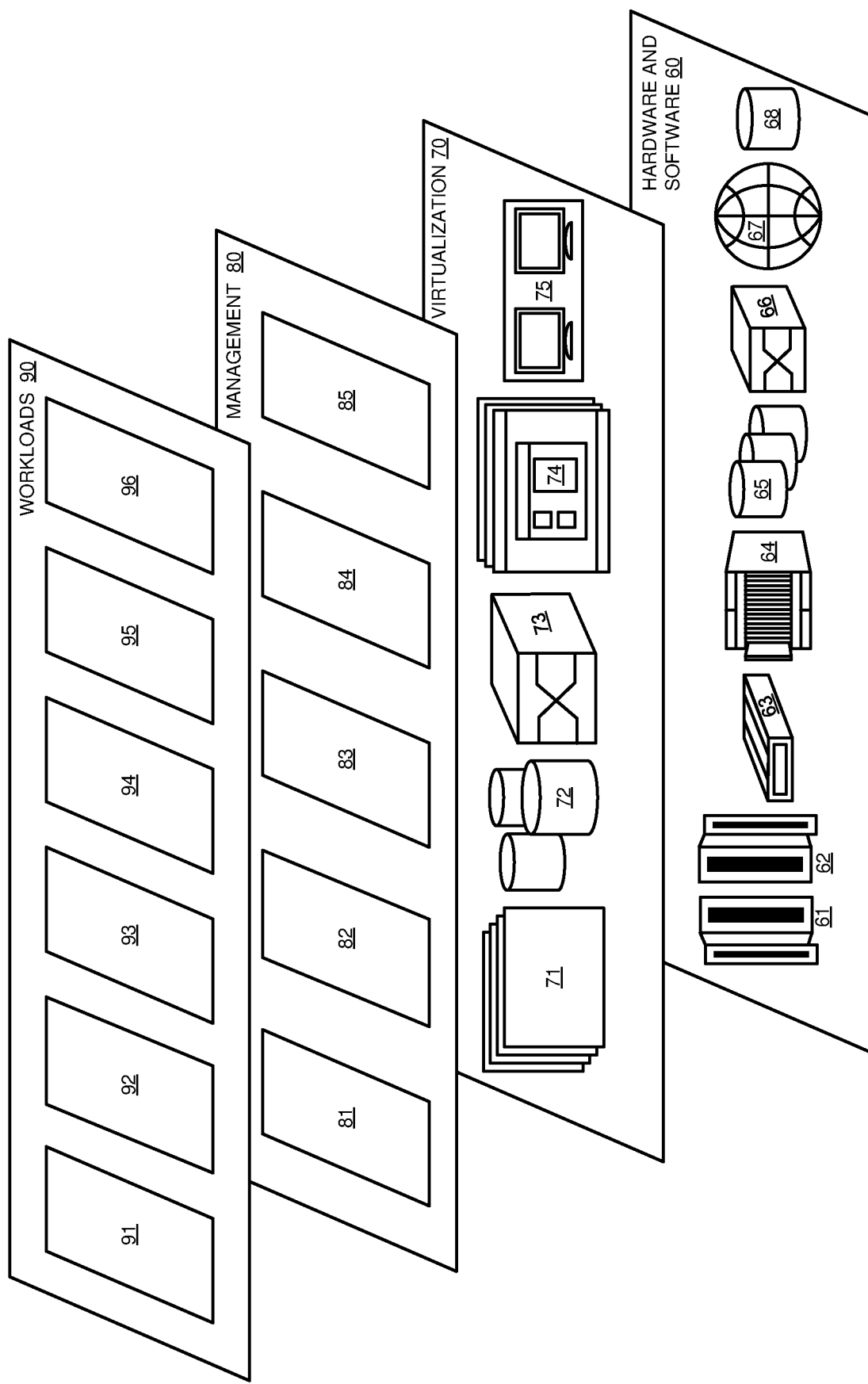
FIG. 2 depicts abstraction model layers according to an embodiment of the present invention.

With reference to FIG. 2, this figure depicts a set of functional abstraction layers provided by cloud computing environment 50 (FIG. 1). It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and in the context of the illustrated embodiments of the present disclosure, various workloads and functions 96 for classification processing. In addition, workloads and functions 96 for classification processing may include such operations as data analysis and machine learning (e.g., artificial intelligence, natural language processing, etc.), as described herein. In some embodiments, the workloads and functions 96 for classification processing also works in conjunction with other portions of the various abstractions layers, such as those in hardware and software 60, virtualization 70, management 80, and other workloads 90 (such as data analytics processing 94, for example) to accomplish the various purposes of the disclosed embodiments.

Figure 3:
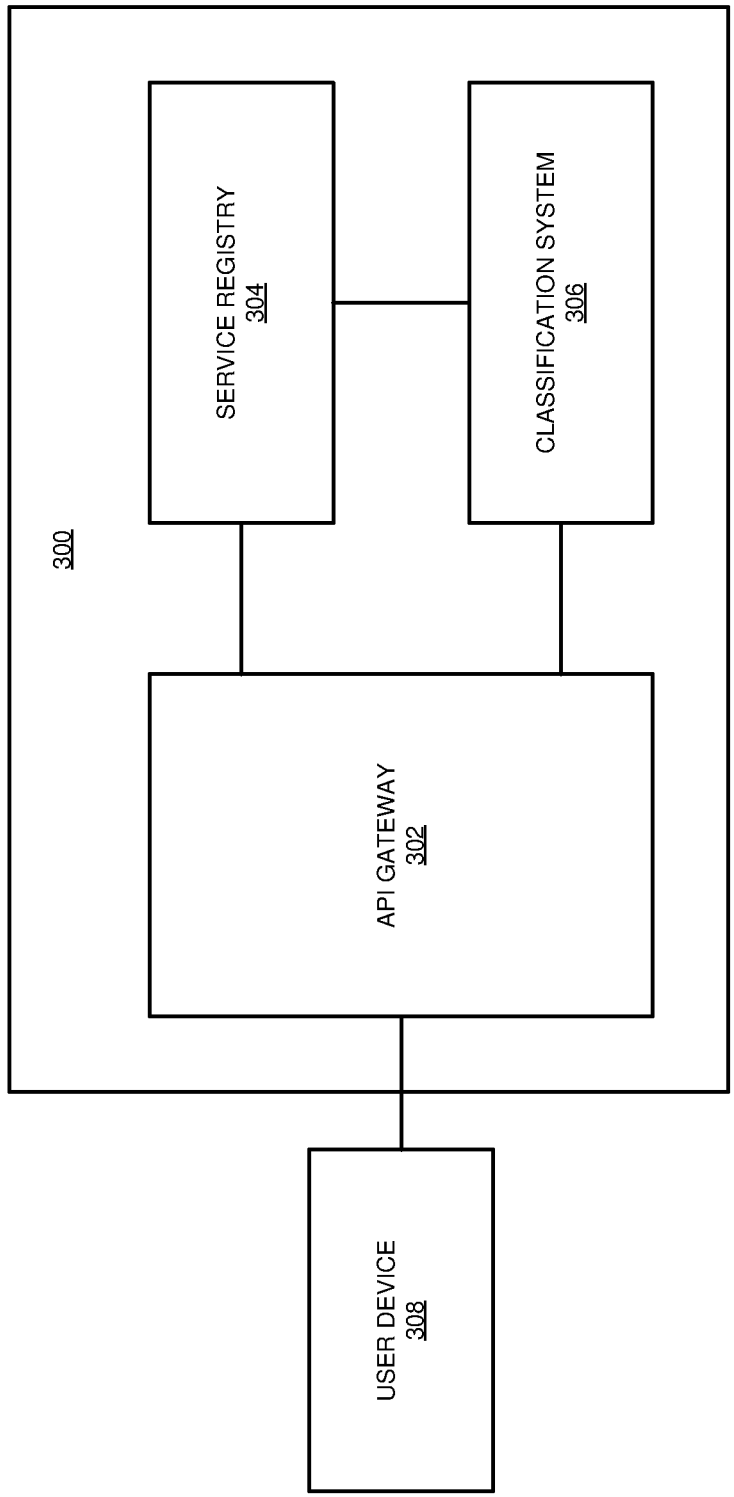
FIG. 3 depicts a block diagram of an example service infrastructure that includes a classification system in accordance with an illustrative embodiment.

With reference to FIG. 3, this figure depicts a block diagram of an example service infrastructure 300 that includes a classification system 306 in accordance with an illustrative embodiment. In some embodiments, the classification system 306 is deployed in workloads layer 90 of FIG. 2. By way of example, in some embodiments, classification system 306 is implemented as classification processing 96 in FIG. 2.

In the illustrated embodiment, the service infrastructure 300 provides services and service instances to a user device 308. User device 308 communicates with service infrastructure 300 via an API gateway 302. In various embodiments, service infrastructure 300 and its associated classification system 306 serve multiple users and multiple tenants. A tenant is a group of users (e.g., a company) who share a common access with specific privileges to the software instance. Service infrastructure 300 ensures that tenant specific data is isolated from other tenants.

In some embodiments, user device 308 connects with API gateway 302 via any suitable network or combination of networks such as the Internet, etc. and uses any suitable communication protocols such as Wi-Fi, Bluetooth, etc. Service infrastructure 300 may be built on the basis of cloud computing. API gateway 302 provides access to client applications like classification system 306. API gateway 302 receives service requests issued by client applications, and creates service lookup requests based on service requests. As a non-limiting example, in an embodiment, the user device 308 is a smartphone, laptop computer, or other computing device.

In the illustrated embodiment, service infrastructure 300 includes a service registry 304. In some embodiments, service registry 304 looks up service instances of classification system 306 in response to a service lookup request such as one from API gateway 302 in response to a service request from user device 308. For example, in some embodiments, the service registry 304 looks up service instances of classification system 306 in response to requests from the user device 308 related to a natural language classification task.

In some embodiments, the service infrastructure 300 includes one or more instances of the classification system 306. In some such embodiments, each of the multiple instances of the classification system 306 run independently on multiple computing systems. In some such embodiments, classification system 306, as well as other service instances of classification system 306, are registered in service registry 304.

In some embodiments, service registry 304 maintains information about the status or health of each service instance including performance information associated each of the service instances. For example, such performance information may include several types of performance characteristics of a given service instance (e.g., cache metrics, etc.). In some embodiments, the extended service registry 304 ranks service instances based on their respective performance characteristics, and selects top-ranking service instances for classification requests. In some such embodiments, in the event that a service instance becomes unresponsive or, unhealthy, the service registry will no longer provide its address or information about this service instance to other services.

Figure 4:
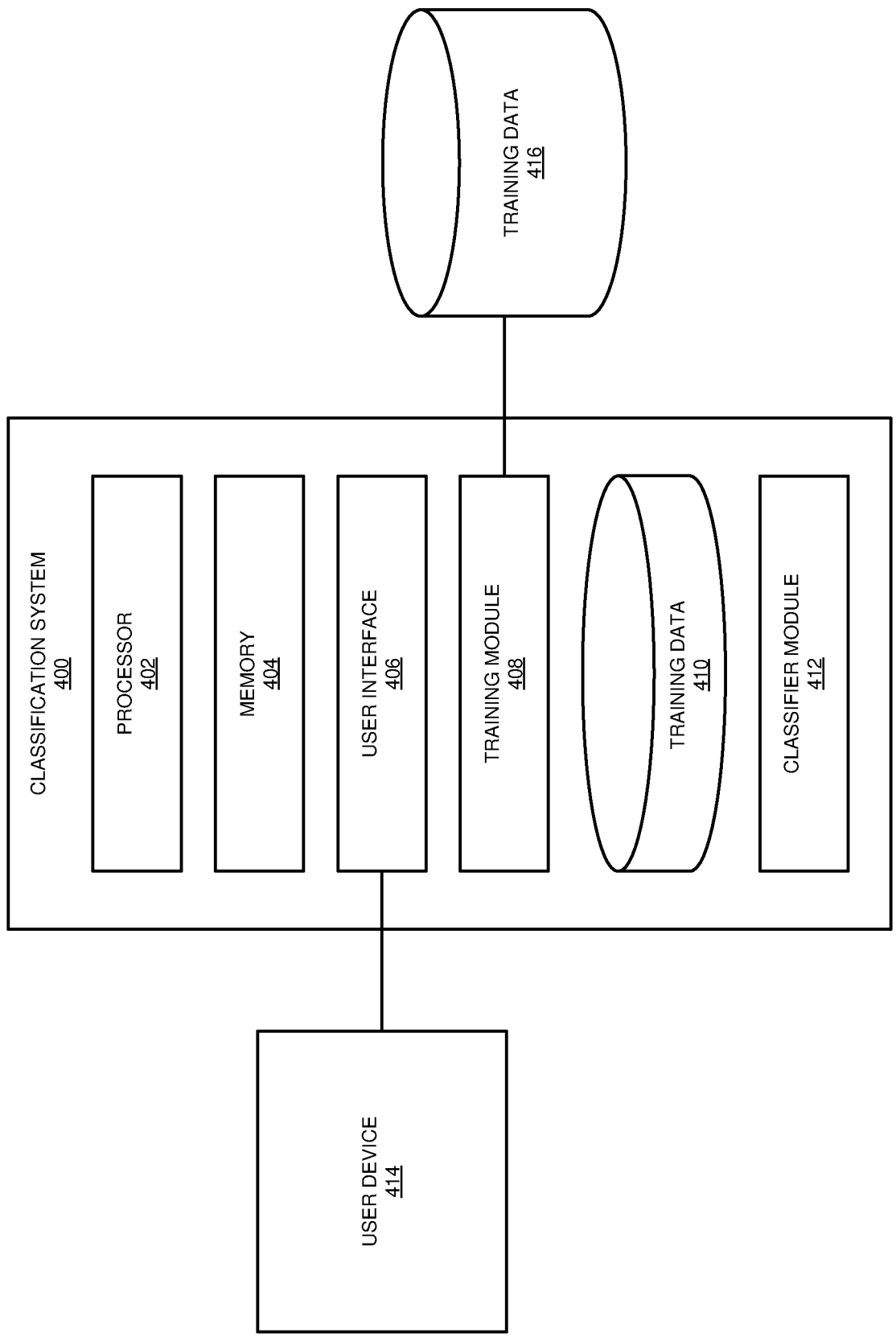
FIG. 4 depicts a block diagram of an example classification system in accordance with an illustrative embodiment.

With reference to FIG. 4, this figure depicts a block diagram of an example classification system 400 in accordance with an illustrative embodiment. In a particular embodiment, the classification system 400 is an example of the workloads and functions 96 for classifier processing of FIG. 2.

In some embodiments, the classification system 400 includes a processor 402, memory 404, a user interface 406, a training module 408, a training data database 410, and a classifier module 412. In alternative embodiments, the classification system 400 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the classification system 400 includes a processing unit ("processor") 402 to perform various computational and data processing tasks, as well as other functionality. The processing unit 402 is in communication with memory 404. In some embodiments, the memory 404 comprises one or more computer readable storage media with program instructions collectively stored on the one or more computer readable storage media, with the program instructions being executable by one or more processors 402 to cause the one or more processors 402 to perform operations described herein.

The classification system 400 includes a user interface 406, which may include a graphic or command line interface that allows a user to communicate with the classification system 400. For example, in some embodiments, the user interface 406 is configured to recognize and take action in response to requests from the user device 414 related to a natural language classification task. In some embodiments, a user device 414 may be any known type of computing device, such as a computer, tablet, or smart phone. In some embodiments, the user interface 406 allows communication with the user device 414 via an API gateway (e.g., API gateway 302 of FIG. 3). In some embodiments, the user interface 406 receives one or more bodies of text, images, video frames, or other content for evaluation by the classifier model 412.

In some embodiments, before the classifier model 412 includes a machine learning model, and before the classifier model 412 is put into production, the machine learning model is trained to perform the desired machine learning tasks by the training module 408. The training module 408 trains the machine learning model of the classifier model 412 using local training data 410 and/or remote training data 416. In some embodiments, training data includes data points in the form of text, images, video, or other content for machine learning tasks, for example classification or natural language processing tasks. In some embodiments, the training data includes a corpus of labels for labeling the data points in the training data.

In some embodiments, the training module 408 generates the classifier model 412 based on a DNN. In alternative embodiments, the training module 408 generates the classifier model 412 based on another type of neural network, for example a CNN or RNN. In an embodiment, training module 408 trains the classifier model 412 using local training data 410 and/or remote training data appropriate for the current domain being modeled.

In some embodiments, the training module 408 receives training data from a local training data storage 410 and/or a remote training data storage 416 and uses the training data to generate a trained machine-learning classifier model for use by the classifier module 412. The term "training data," as used herein, refers to data that is familiar to users seeking to train a machine-learning model. For example, in some embodiments, the training data includes a training dataset designed to train a machine-learning model that will be able to generalize enough to accurately make predictions about new data, for example about features or objects that are not part of the training dataset. In some embodiments, the training module 408 receives training data from a local training data storage 410 and/or a remote training data storage 416 and uses a portion of the training data as a testing data set so that the trained model can be tested for problems, such as overfitting, before the trained model is ready for consumers.

In some embodiments, the classification model is intended to classify text, training module 408 trains the classification model using a corpus of text data. In some embodiments, the classification model tries to "learn" from the training data by creating generalized mappings between input and output data for making predictions for new inputs where the output variable is unknown. In some embodiments, the training module 408 uses any of a variety of known algorithms having tunable parameters that are adjusted during the training phase to improve the accuracy of the model's predicted outputs for new inputs.

In some embodiments, the classifier model 412 includes one or more machine learning models. In some embodiments, the classifier model 412 includes a classification model that performs classification tasks. As a non-limiting example, in some embodiments, the classifier model 412 includes a deep semantic classification model. In some embodiments, the machine learning model 412 includes one or more machine learning models, non-limiting examples of which include machine learning models that perform image classification, natural-language based classification, logistic regression. In some embodiments, the classifier model 412 includes a machine learning model that includes a neural network, such as an ANN, for example a CNN, RNN, or DNN. Those skilled in the art will appreciate that still further embodiments may be implemented using various other know classification or regression models.

Figure 5:
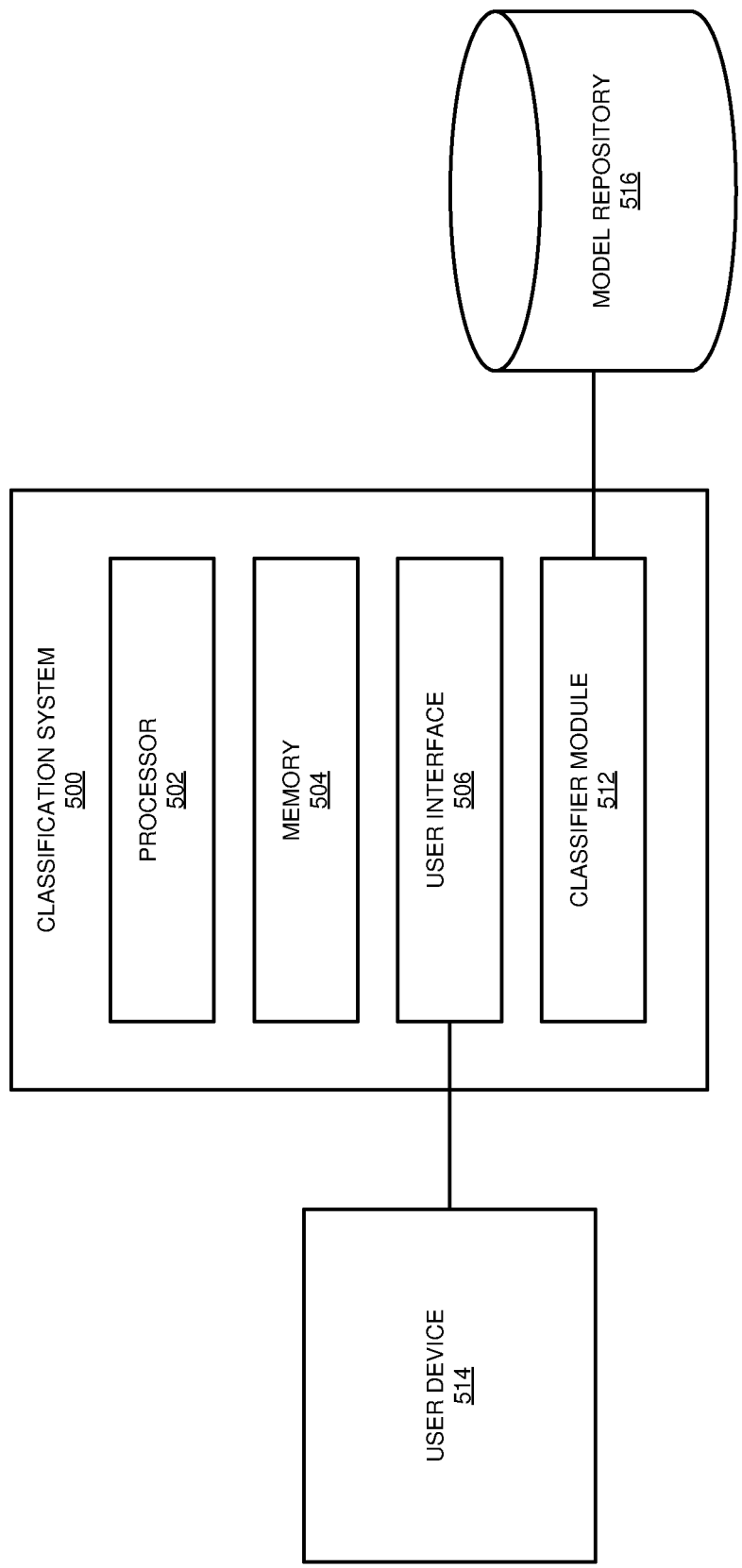
FIG. 5 depicts a block diagram of an alternative embodiment of an example classification system in accordance with an illustrative embodiment.

With reference to FIG. 5, this figure depicts a block diagram of an alternative embodiment of an example classification system 500 in accordance with an illustrative embodiment. In a particular embodiment, the classification system 500 is an example of the workloads and functions 96 for classifier processing of FIG. 2.

In some embodiments, the classification system 500 includes a processor 502, memory 504, a user interface 506, and a classifier module 512. In some embodiments, the classifier model 512 includes training validation functionality for automatically and autonomously evaluating a candidate retraining dataset. In alternative embodiments, the classification system 500 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the classification system 500 includes a processing unit ("processor") 502 to perform various computational and data processing tasks, as well as other functionality. The processing unit 502 is in communication with memory 504. In some embodiments, the memory 504 comprises one or more computer readable storage media with program instructions collectively stored on the one or more computer readable storage media, with the program instructions being executable by one or more processors 502 to cause the one or more processors 502 to perform operations described herein.

The classification system 500 includes a user interface 506, which may include a graphic or command line interface that allows a user to communicate with the classification system 500. For example, in some embodiments, the user interface 506 is configured to recognize and take action in response to requests from the user device 514 related to related to a natural language classification task. In some embodiments, a user device 514 may be any known type of computing device, such as a computer, tablet, or smart phone. In some embodiments, the user interface 506 allows communication with the user device 514 via an API gateway (e.g., API gateway 302 of FIG. 3). In some embodiments, the user interface 506 receives one or more bodies of text, images, video frames, or other content for evaluation by the classifier model 512.

In some embodiments, before the classifier model 512 includes a machine learning model, and before the classifier model 512 is put into production, the machine learning model is trained to perform the desired machine learning tasks and stored in a model repository 516. In some embodiments, the model repository 516 includes one or more machine learning models. In some embodiments, the classifier model 512 uses a classification model from the model repository 516 that performs classification tasks. As a non-limiting example, in some embodiments, the classifier model 512 includes a deep semantic classification model. In some embodiments, the machine learning model 512 includes one or more machine learning models, non-limiting examples of which include machine learning models that perform image classification, natural-language based classification, logistic regression. In some embodiments, the classifier model 512 includes a machine learning model that includes a neural network, such as an ANN, for example a CNN, RNN, or DNN. Those skilled in the art will appreciate that still further embodiments may be implemented using various other know classification or regression models.

Figure 6:
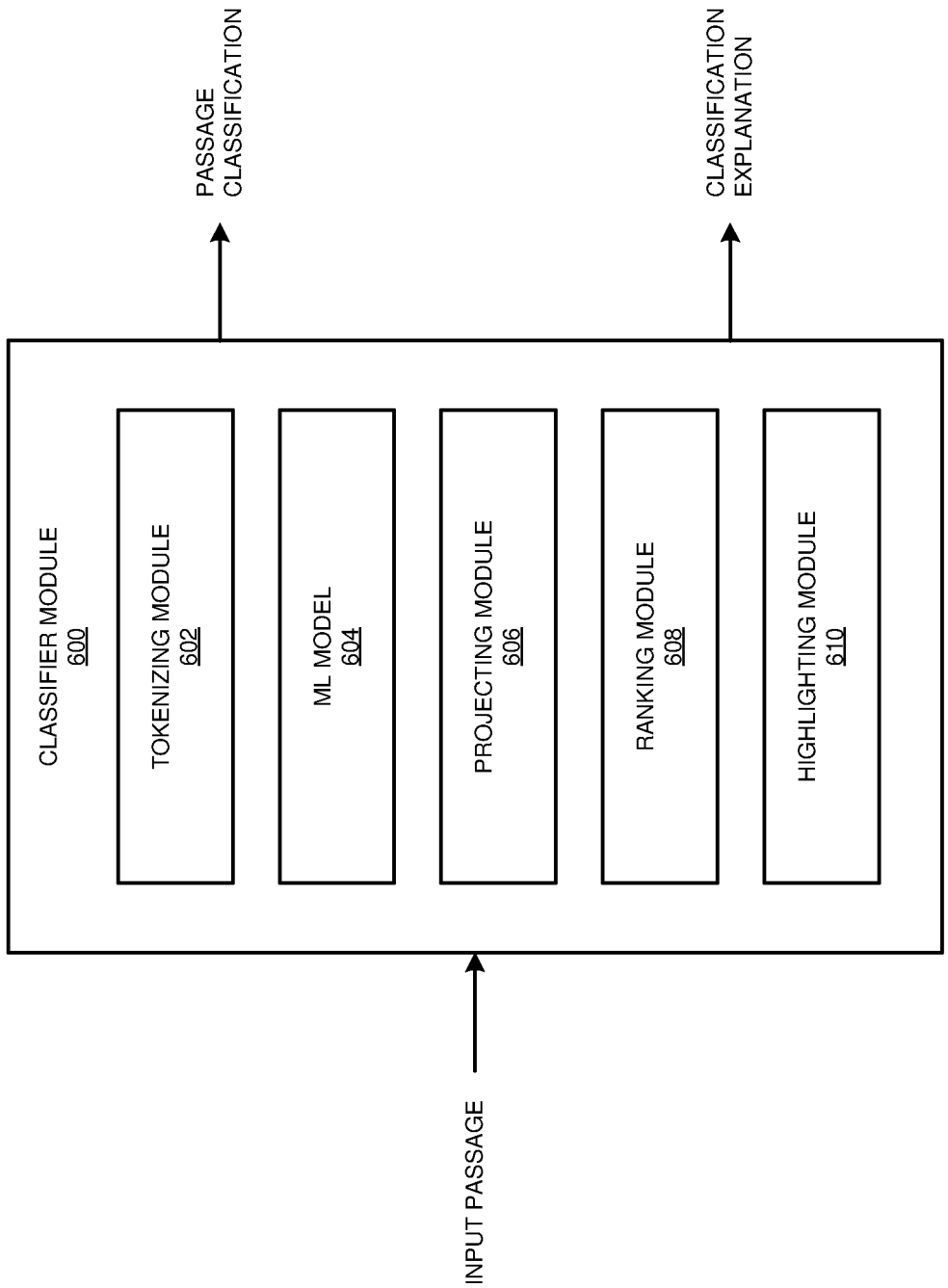
FIG. 6 depicts a block diagram of an example classifier module in accordance with an illustrative embodiment.

With reference to FIG. 6, this figure depicts a block diagram of an example classifier module 600 in accordance with an illustrative embodiment. In a particular embodiment, the classifier module 600 is an example of the classifier module 412 of FIG. 4 or classifier module 512 of FIG. 5.

In some embodiments, the training validation module 600 includes a tokenizing module 602, an ML model 604, a projecting module 606, a ranking module 608, and a highlighting module 610. In alternative embodiments, the training validation module 600 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the tokenizing module 602 receives a novel input passage to be classified and tokenizes the input passage into an n-gram sequence of tokens, for example where each token is a unigram or bigram. In some embodiments, each n-gram is a sequence of adjacent elements from a string, where each element may be a word, a letter, or a symbol.

In the illustrated embodiment, the classifier module 600 evaluates the novel input passage using an ML model 604. In some such embodiments, the ML model includes a trained classification model that generates an output indicative of a classification of the input passage in one of a plurality of predefined classes. In some such embodiments, the ML model 604 is a trained deep semantic classification model. In some embodiments, the output of the ML model 604 includes a vector of probability values corresponding to respective classes of the plurality of predefined classes.

In the illustrated embodiment, the projecting module 606 generates token vectors for respective tokens of the sequence of tokens. In some such embodiments, the projecting module 606 projects each of the token vectors to a higher dimensional space, resulting in projected token vectors. In some embodiments, the trained classification model is an n-dimensional model, and the projecting module 606 projects each of the token vectors to a 2*n-dimensional space. For example, in some embodiments, the classification module is a 50-dimensional model, and the projecting module 606 projects each of the token vectors to a 100-dimensional space.

An exemplary non-limiting embodiment of the projecting module 606 may be implemented as follows:

```
public List<Double> project(Collection<List<Double>> tokenVectors) {
    int dimensions = calculateDimensions(tokenVectors);
    if(dimensions == -1) {
        return null;
    }
    List<Double> mins = new ArrayList<>( );
    List<Double> maxes = new ArrayList<>( );
    for(int i = 0; i < dimensions; i++) {
        mins.add(Double.POSITIVE_INFINITY);
        maxes.add(Double.NEGATIVE_INFINITY);
    }
    for(List<Double> tokenVector : tokenVectors) {
        if(tokenVector != null) {
            for(int i = 0; i < tokenVector.size( ); i++) {
                double val = tokenVector.get(i);
                mins.set(i, Math.min(val, mins.get(i)));
                maxes.set(i, Math.max(val, maxes.get(i)));
            }
        }
    }
    List<Double> result = new ArrayList<>( );
    result.addAll(mins);
    result.addAll(maxes);
    return result;
}
```

In the illustrated embodiment, the ranking module 608 generates similarity scores for each of a plurality of class representations to the novel input passage. In some embodiments, the class representations include reference passages representative of respective classes of variation distinguished by the ML model 604. In various embodiments, the reference passages may be predefined or may be input by a user. Alternative embodiments may utilize other types of class representations. For example, in some embodiments, the ML model 604 may be trained to perform sentiment analysis by classifying a passage according to polarity (e.g., positive, negative, or neutral) or according to urgency (e.g., highly urgent, moderately urgent, not urgent, etc.). In some such embodiments, the class representations may include features such as word counts (e.g., total numbers of positive and negative words) or n-gram counts (e.g., total numbers of positive and negative bigrams, trigrams, etc.).

In some embodiments, the ranking module 608 calculates the similarity of each class representation to a vector representation of the novel input passage using any known method of measuring the similarity of two n-grams of text, such as cosine similarity. In some embodiments, the ranking module 608 includes a Gaussian Naïve Bayes (GNB) classifier for determining the degree of similarity of the novel input passage to each of the class representations. The ranking module 608 then outputs a ranked list of the class representations as an ordered of most to least (or vice-versa) similar to the novel input passage.

In the illustrated embodiment, the highlighting module 610 ranks n-grams in the novel input passage based on their fit in a previously established reference class. In some embodiments, this is done by summing the fit of each n-gram based on the fit with each class, with the fit of unselected classes counting negatively. An exemplary non-limiting embodiment of the highlighting module 610 may be implemented as follows:

embodiment, the highlighting module 700 is an example of the highlighting module 610 of FIG. 6.

In some embodiments, the highlighting module 700 includes a comparison module 702 and a list generation module 704. In alternative embodiments, the highlighting module 700 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In some embodiments, the comparison module 702 receives each of the projected token vectors from the projecting module 606 of FIG. 6. In the illustrated embodiment, the projected token vectors are represented as m projected token vectors 706-709. It will be appreciated that m is representative of any number of actual projected token vectors. The comparison module 702 also receives n reference passages or other class representations. In the illustrated embodiment, the reference passages are represented as n reference passages 712-714. It will be appreciated that n is representative of any number of actual reference passages.

The comparison module 702 iterates through each of the m projected token vectors 706-709 individually. For example, for the first iteration, the comparison module 702 calculates n similarity distance values for the first projected token vector 706—one for each of the n reference passages

```
public Map<String, Double> highlight(Map<String,List<Double>>
inputTokensAndVectors, String cluster, Map<String,List<Double>> clusterVectors) {
    Map<String,Double> result = new HashMap<>( );
    for(Entry<String,List<Double>> e : inputTokensAndVectors.entrySet( )) {
        if(e.getValue( ) != null) {
            List<Double> projectedTokenVector =
this.projector.project(Collections.singletonList(e.getValue( )));
            double agg = 0.0;
            for(Entry<String,List<Double>> f : clusterVectors.entrySet( )) {
                if(f.getValue( ) != null) {
                    double score =
DeepSemanticClassifierUtils.cosineSimilarity(projectedTokenVector, f.getValue( ));
                    if(!f.getKey( ).equals(cluster)) {
                        score *= -1;
                    }
                    agg += score;
                }
            }
            result.put(e.getKey( ), agg);
        }
    }
    return DeepSemanticClassifierUtils.sort(result);
}
```

In some embodiments, the highlighting module 610 calculates the similarity of each of the projected token vectors representative of respective n-grams of the input passage to each of the class representations. For example, in such embodiments, the highlighting module 610 generates a first similarity score for the first projected token vector based on comparisons of the first projected token vector to each of the plurality of class representations, generates a second similarity score for a second projected token vector based on comparisons of the second projected token vector to each of the plurality of class representations, and so on for each of the projected token vectors.

Figure 7:
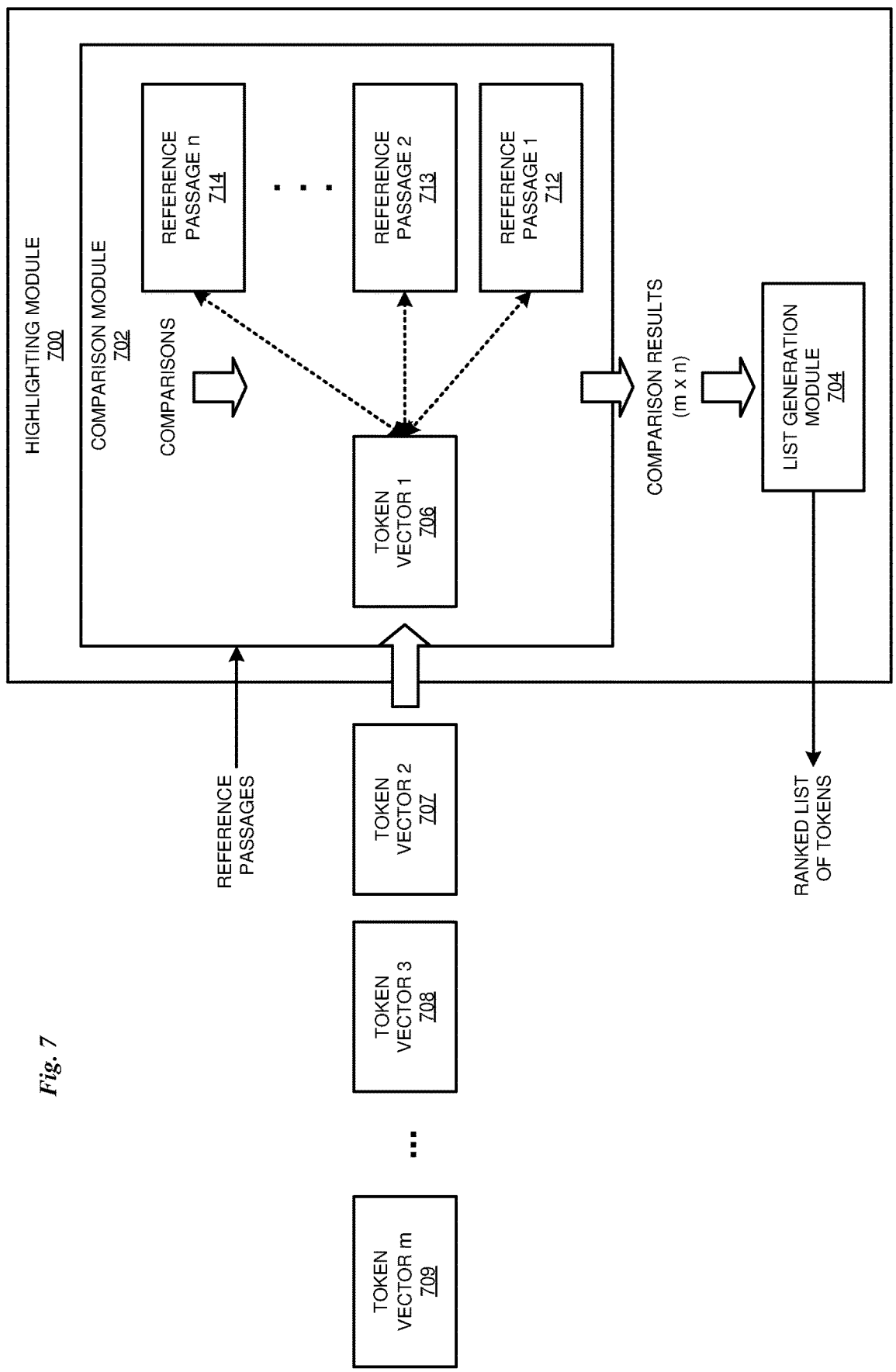
FIG. 7 depicts a block diagram of an example highlighting module in accordance with an illustrative embodiment.

With reference to FIG. 7, this figure depicts a block diagram of an example highlighting module 700 in accordance with an illustrative embodiment. In a particular 712-714—based on distance values determined for each of the n reference passages 712-714 from the first projected token vector 706. In some such embodiments, the comparison module 702 then compares each of the plurality of similarity distance values for the first projected token vector 706 to a predetermined threshold value, and associates the first projected token vector 706 with each class for which the similarity distance value is within a threshold distance (i.e., less than the predetermined threshold value). The comparison module 702 then repeats this process for each of the remaining projected token vectors 707-709. The result of this processing by the comparison module 702 will be a list of the n-grams corresponding to the m projected token vectors 706-709 and their respective associated one or more (or none) classes or distance values.

In some embodiments, the classifier module 600 will select one of the classes as a designated class, and its associated class representation as a designated class representation. In some alternative embodiments, the user selects one of the classes as a designated class, and its associated class representation as a designated class representation. In some embodiments, the user may opt to select the designated class and designated class representation, for example to investigate the reason for a particular ML model class prediction, or may opt to allow the classifier module 600 to select the designated class and designated class representation.

The list generation module 704 will then calculate similarity scores for each of the n-grams of the novel input passage to the designated class or designated class representation. In some such embodiments, the list generation module 704 calculates the similarity scores by adding one or more points if the n-gram is associated with the designated class, and by subtracting one or more points if the n-gram is associated with one or more classes other than the designated class. In some such embodiments, the list generation module 704 calculates the similarity scores by adding one or more points if the n-gram is associated with the designated class, with the number of points that are added depending on the distance calculated by the list generation module 704 from the designated class representation, where the number of points is inversely proportional to the distance. In some such embodiments, the list generation module 704 calculates the similarity scores by subtracting one or more points if the n-gram is associated with one or more classes other than the designated class, with the number of points that are subtracted depending on the distance(s) calculated by the list generation module 704 from the other class representations, where the number of points subtracted is inversely proportional to the respective distance.

The list generation module 704 then generates a ranked list of the tokens (n-grams of the novel input passage). In some embodiments, the list generation module 704 generates the ranked list according to the similarity scores, from most similar to least similar (or vice-versa). The list generation module 704 then outputs this list as a classification explanation that provides a user with an indication of which word or phrase from the input passage were most and least influential to the ML model when classifying the passage. In some embodiments, the list generation module 704 outputs the list to a user interface, such as user interface 406 of FIG. 4, which then renders a display of the ranked list of the words or phrases determined by the highlighting module 700.

With reference to FIG. 8, this figure depicts a flowchart of an example process 800 for generating passage classification explanations in accordance with an illustrative embodiment. In a particular embodiment, the classification system 400 carries out the process 800.

In an embodiment, at block 802, the process tokenizes an input passage into an n-gram sequence of tokens. Next, at block 804, the process evaluates the input passage using a trained classification model that generates an output indicative of a classification of the input passage in one of a plurality of predefined classes. In some embodiments, the trained classification model is a trained deep semantic classification model. In some embodiments, the output of the trained classification model includes a vector of probability values corresponding to respective classes of the plurality of predefined classes.

Next, at block 806, the process generates a token vector for each token of the sequence of tokens. For example, the process generates a first token vector for the first token of the sequence of tokens, a second token vector for a second token of the sequence of tokens, and so on for each token.

Next, at block 808, the process projects each of the token vectors to a higher dimensional space, resulting in respective projected token vector. In some embodiments, the trained classification model is an n-dimensional model, and the process projects each of the token vectors to a 2*n-dimensional space.

Next, at block 810, the process generates a similarity score for each projected token vector based on comparisons of the each projected token vector to each of a plurality of class representations. In some embodiments, the process includes automatically designating, as a designated class, the one of the plurality of predefined classes in which the trained classification model classified the input passage. Alternatively, in some embodiments, the process receives a user input indicative of a class selected by a user, and the process designates the user-indicated class as the designated class. In some embodiments, the plurality of class representations includes a reference passage in the designated class and one or more reference passages respective other non-designated classes. In some embodiments, the process generates the first similarity score according to an algorithm that includes adding a value when a projected token vector is associated with the designated class and subtracts a value when the projected token vector is associated with a class other than the designated class.

Next, at block 812, the process generates a ranked list of the tokens associated with the projected token vectors according to the similarity scores of the respective projected token vectors. In some embodiments, the process includes rendering a display of the ranked list of the tokens as a classification explanation. This displayed information effectively opens the "black box" and provides a solution to the problem of trying to understand the basis for a neural network classification.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of #8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer implemented method comprising:
receiving an input passage and a class selection, the input passage being a part of a service request received over an application programming interface (API) from a user device, and the input passage comprising Natural Language data that is tokenizable in an n-gram sequence of tokens;
tokenizing the input passage into the n-gram sequence of tokens;
evaluating the input passage using a trained classification model within a natural language processing neural network that generates an output indicative of a classification of the input passage in one of a plurality of predefined classes, the predefined classes including a class corresponding to the class selection;
generating a first token vector for a first token of the n-gram sequence of tokens;
projecting the first token vector to a higher dimensional space, resulting in a first projected token vector, the higher dimensional space being a multiple of a dimensional space associated with the trained classification model;
generating a first similarity score for the first projected token vector based on comparisons of the first projected token vector to each of a plurality of class representations, each class representation corresponding to one of the plurality of predefined classes, and the first projected token vector being associated with each of the plurality of predefined classes for which a similarity distance value meets a predetermined threshold;
generating a ranked list of the tokens, wherein the generating of the ranked list includes ranking the first token among others of the tokens based on the first similarity score; and
displaying the ranked list of the tokens.

2. The method of claim 1, wherein the trained classification model is a trained deep semantic classification model.

3. The method of claim 2, wherein the output of the trained classification model includes a vector of probability values corresponding to respective classes of the plurality of predefined classes.

4. The method of claim 1, further comprising generating a second token vector for a second token of the n-gram sequence of tokens.

5. The method of claim 4, further comprising projecting the second token vector to the higher dimensional space, resulting in a second projected token vector.

6. The method of claim 5, wherein the trained classification model is an n-dimensional model, and wherein the higher dimensional space is a 2n-dimensional space.

7. The method of claim 5, further comprising generating a second similarity score for the second projected token vector based on comparisons of the second projected token vector to each of the plurality of class representations.

8. The method of claim 7, wherein the generating of the ranked list of tokens further comprises ranking the second token among others of the tokens based on the second similarity score.

9. The method of claim 1, wherein the plurality of class representations includes a first reference passage in a designated class from among the plurality of predefined classes and a second reference passage in one of the plurality of predefined classes other than the designated class, and wherein the comparisons of the first projected token vector to each of the plurality of class representations includes a first comparison of the first projected token vector to the first reference passage and a second comparison of the first projected token vector to the second reference passage.

10. The method of claim 9, further comprising automatically designating, as the designated class, the one of the plurality of predefined classes in which the trained classification model classified the input passage.

11. The method of claim 9, further comprising:
receiving a user input indicative of a class selected by a user; and
designating, as the designated class, the class selected by the user.

12. The method of claim 9, wherein the generating of the first similarity score further comprises adding a first value resulting from the first comparison and subtracting a second value resulting from the second comparison.

13. The method of claim 1, further comprising rendering a display of the ranked list of the tokens.

14. The method of claim 1, wherein the plurality of class representations includes a first reference feature in the one of the plurality of predefined classes in which the trained classification model classified the input passage, and a second reference feature in one of the plurality of predefined classes other than the one of the plurality of predefined classes.

15. A computer program product, the computer program product comprising one or more non-transitory computer readable storage media, and program instructions collectively stored on the one or more non-transitory computer readable storage media, the program instructions executable by one or more processors to cause the one or more processors to perform operations comprising:
receiving an input passage and a class selection, the input passage being a part of a service request received over an application programming interface (API) from a user device, and the input passage comprising Natural Language data that is tokenizable in an n-gram sequence of tokens;
tokenizing the input passage into the n-gram sequence of tokens;
evaluating the input passage using a trained classification model within a natural language processing neural network that generates an output indicative of a classification of the input passage in one of a plurality of predefined classes, the predefined classes including a class corresponding to the class selection;
generating a first token vector for a first token of the n-gram sequence of tokens;
projecting the first token vector to a higher dimensional space, resulting in a first projected token vector, the higher dimensional space being a multiple of a dimensional space associated with the trained classification model;
generating a first similarity score for the first projected token vector based on comparisons of the first projected token vector to each of a plurality of class representations, each class representation corresponding to one of the plurality of predefined classes, and the first projected token vector being associated with each of the plurality of predefined classes for which a similarity distance value meets a predetermined threshold;
generating a ranked list of the tokens, wherein the generating of the ranked list includes ranking the first token among others of the tokens based on the first similarity score; and displaying the ranked list of the tokens.

16. The computer program product of claim 15, wherein the stored program instructions are stored in a computer readable storage device in a data processing system, and wherein the stored program instructions are transferred over a network from a remote data processing system.

17. The computer program product of claim 15, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
program instructions to meter use of the program instructions associated with the request; and
program instructions to generate an invoice based on the metered use.

18. The computer program product of claim 15, wherein the plurality of class representations includes a first reference passage in a designated class from among the plurality of predefined classes and a second reference passage in one of the plurality of predefined classes other than the designated class, and wherein the comparisons of the first projected token vector to each of the plurality of class representations includes a first comparison of the first projected token vector to the first reference passage and a second comparison of the first projected token vector to the second reference passage.

19. The computer program product of claim 18, further comprising automatically designating, as the designated class, the one of the plurality of predefined classes in which the trained classification model classified the input passage.

20. A computer system comprising one or more processors and one or more computer readable storage media, and program instructions collectively stored on the one or more computer readable storage media, the program instructions executable by the one or more processors to cause the one or more processors to perform operations comprising:
receiving an input passage and a class selection, the input passage being a part of a service request received over an application programming interface (API) from a user device, and the input passage comprising Natural Language data that is tokenizable in an n-gram sequence of tokens;
tokenizing the input passage into the n-gram sequence of tokens;
evaluating the input passage using a trained classification model within a natural language processing neural network that generates an output indicative of a classification of the input passage in one of a plurality of predefined classes, the predefined classes including a class corresponding to the class selection;
generating a first token vector for a first token of the n-gram sequence of tokens;
projecting the first token vector to a higher dimensional space, resulting in a first projected token vector, the higher dimensional space being a multiple of a dimensional space associated with the trained classification model;

generating a first similarity score for the first projected token vector based on comparisons of the first projected token vector to each of a plurality of class representations, each class representation corresponding to one of the plurality of predefined classes, and the first projected token vector being associated with each of the plurality of predefined classes for which a similarity distance value meets a predetermined threshold;

generating a ranked list of the tokens, wherein the generating of the ranked list includes ranking the first token among others of the tokens based on the first similarity score; and displaying the ranked list of the tokens.

* * * * *